United States Patent [19]

Gambaretto et al.

[11] 4,107,388

[45] Aug. 15, 1978

[54] METHOD FOR THE SURFACE TREATMENT OF GLASS BY LEACHING

[75] Inventors: Gian Paolo Gambaretto, Padua; Vittorio Gottardi, Venice, both of Italy

[73] Assignee: Industrie Zignago S. Margherita S.p.A, Fossalta Di Portogruaro (Venice), Italy

[21] Appl. No.: 766,968

[22] Filed: Feb. 9, 1977

[30] Foreign Application Priority Data

Feb. 16, 1976 [IT] Italy .................................. 20198 A/76

[51] Int. Cl.² ............................................. C03C 15/00
[52] U.S. Cl. ......................................... 428/428; 65/31; 65/60 D
[58] Field of Search .................. 65/31, 60 D; 428/428

[56] References Cited

U.S. PATENT DOCUMENTS 2,490,662    12/1949    Thomsen .............................. 65/31 X

*Primary Examiner*—Arthur D. Kellogg
*Attorney, Agent, or Firm*—Oblon, Fisher, Spivak, McClelland & Maier

[57] ABSTRACT

In the method for the removal of alkalies from glass surfaces and articles by reaction with hydrofluoric acid, the glass surface is contacted with a gas stream containing a compound of fluorine and silicium, preferably silicium tetrafluoride, and water in a predetermined ratio, the treatment being carried out at high temperature. Depending on the treatment conditions, a deposition of finely divided silica onto the glass surface under treatment can be obtained.

7 Claims, No Drawings

METHOD FOR THE SURFACE TREATMENT OF GLASS BY LEACHING

The present invention relates to the treatment of glass surfaces, aiming to improve the resistance of the glass to chemical attack.

In order to improve such a resistance several methods are possible and foreseen, amongst which:
to modify the composition of the glass; medium
to cause the formation of sodium sulfate, it being subsequently removed from the surface by hot washing with $SO_2$;
to carry out the combustion of a fluorinated organic compound according to the process so-called "IT" of the firm BALL BROS.

In fact it is known that the greater is the alkali amount in the glass structure, the lower is the chemical resistance of the glass, since the presence of the alkali affects the firmness of the Si—O bond responsible of the relevant chemical inertia of the glass formed only by silica.

The above mentioned methods aim to reduce the alkali percentage either in the mass or at the surface, whereby a more resistant structure is presented to the attacking agents. the Every one of the above systems is, however, affected by its own disadvantages: generated change of the chemical composition of the glass, besides involving higher costs due to the greater melting temperature, may lead to more difficulty workable glass; in turn, the use of $SO_2$, besides being expensive and causing corrosion phenomena in the furnaces, involves an exceedingly toxic gas.

The "IT" process of BALL BROS., according to which HF is generated in situ through the combustion of difluoroethane ($CHF_2$ — $CH_3$), provides for the use, although in small amounts, of an expensive organic product and is affected by technological difficulties in connection with the need of dosing and admixing two gases, namely air and difluoroethane. To this the risk must be added that the hydrofluoric acid, besides attacking the alkalies, may also partially remove the silica according to the reaction:

$$4HF + SiO_2 \rightleftarrows SiF_4 + 2H_2O \quad (1)$$

whereby a continuous and very careful control of the reaction is required. to also rotation Now it has been found, which constitutes the object of the present invention, a process for the surface treatment of glass to improve the resistance thereof to the chemical attack, the process being based on the removal of the alkali by reaction with hydrofluoric acid and being characterized in that the glass surface to be treated is maintained into contact with a gas stream containing a compound of fluorine and silicium and water, at a temperature of between 400° and 700° C.

More particularly, the present invention provides for maintaining the glass surface to be treated into contact with a gas stream containing silicium tetrafluoride and water at a temperature within the above stated range, whereby in the gas stream the following equilibrium is generated:

$$SiF_4 + 2H_2O \rightleftarrows 4HF + SiO_2 \quad (2)$$

According to a further feature of the present invention, the said gas stream for the treatment of the glass surface is generated by bubbling a gas stream, preferably air, through a solution of hydrofluoric acid, which contains silica as bottom body, the solution being kept at a constant temperature, whereby the gas stream is saturated with $SiF_4$ and $H_2O$ giving place to the previously indicated equilibrium in the gas phase.

Without imposing exact limitations to the scope of the present invention, it seems plausible to believe that the following properties and characteristics are at the basis of the present invention:

1. The vapours in the equilibrium condition with a solution of fluosilicic acid with silica as the bottom body are simply composed by $SiF_4$ and $H_2O$ (but they do not contain HF, as on the contrary stated in the literature), and are generated by solutions in which the molar ratio F/Si is of between 5.0 and 5.2 (on the average 5.1), but it is not six as it would be attributable to the formula $H_2SiF_6$.

2. The behaviour of these solutions is of the pseudo-azeotropic type, since for each temperature there exists a certain concentration of fluosilicic acid at a molar ratio F/Si = 5.1 which remains constant and in equilibrium with the $SiF_4$ and with $H_2O$, and which takes place even if the concentrations of $SiF_4$ and $H_2O$ in the condensed vapour are different with respect to those of the starting acid. This occurs due to the continuous attack of the suspended $SiO_2$ by the hydrofluoric acid which is developed, according to the following equations:

$$3H_2SiF_{6\,sol.} \rightarrow 3SiF_{4\,g.} + 6HF_{sol.} \quad (3)$$

$$6HF_{sol.} + SiO_{2\,susp.} \rightleftarrows H_2SiF_{6\,sol.} + 2H_2O \quad (4)$$

Thus, the gas stream for the treatment of the glass surface in order to reduce the alkali content thereof, does constantly contain silica, as caused by the occurrence in the gas phase of the previously indicated equilibrium, namely:

$$SiF_4 + 2H_2O \rightarrow 4HF + SiO_2$$

and, under these conditions, the alkalies of the glass can be attacked by the HF, the equilibrium being more and more displaced towards the right side, whereby not only it is ensured that the silica present in the glass is not attacked by the same HF, but, under suitable conditions, $SiO_2$ in an extremely divided form is deposited (with a particle size of between 0.1 and 0.3 microns), so as to coat the glass surface.

Granted that to the equation (2) a constant $K_p$ corresponds (according to the Lenfesty equation log $K_p$ = 5.547 − 6383/T)

$$K_p = p^4HF/p^2H_2O \cdot PSiF_4$$

the value of which varies depending on the temperature (for instance, at 575° C, $K_p$ = 0.01), by suitably selecting the temperature of the solution of fluosilicic acid, by which the ratio $SiF_4/H_2O$ in the treatment gas stream is controlled, as well as the temperature of the glass surface and the time of the same treatment, the thus treated glass surfaces may remain transparent or be made variously opaque through the $SiO_2$ deposition. More particularly the amount of the possible $SiO_2$ deposition onto the treated glass could be increased by raising the temperature of the saturator in which the gas stream is saturated with $SiF_4$ and $H_2O$.

In turn the apparatus needed for practising the process of the present invention comprises a saturator, containing the suspension of fluosilicic acid (generally with a fluorine content of 23 - 36% and a molar ratio F/Si = 5.0 - 5.2) and silica, the saturator being kept at the desired temperature (generally in the range of 50° to 100° C), a rotameter or flowmeter to measure the gas stream (generally air) and a conveying pipe from the saturator to the glass to be treated.

This pipe must be insulated and heated at least at the temperature of the saturator to prevent saturated vapours from condensing with the consequent separation of silica and clogging of the same pipe.

Amongst the advantages afforded by the present invention stationary the following are worth of a particular mention: illustrated (a) use of inexpensive reactants; the suspension which is used is preferably that coming from the treatment of the flue gases containing fluorine in the glass industry, in the fertilizer industries, etc. in which the fluorine is just disposed in form of $SiF_4$ and must be removed for ecological reasons by water absorption. shaft The absorption reaction in $H_2O$ is the following:

$$3SiF_4 + 2H_2O \rightarrow 2H_2SiF_6 + SiO_2 \qquad (5)$$

(b) easy dosage of the reactants: upon predetermining the temperature of the saturator, it is sufficient to adjust the air flow rate to ensure the amount of reactants desired with the time.

(c) a glass is obtained having higher resistance to the chemical attack than whatever other treatment: in fact, not only the alkalies are removed from the surfaces for instance of jars in form of fluorides, but a surface deposit of silica may be obtained which, depending on the time and on the temperature of the post-treatment conditioning, may result in an article of manufacture, the treated surface of which is alike to that of a quartz jar. (shown This is of particular interest in the case of jars, the afore said deposit being obtained also onto the internal surfaces.

Some examples of the process of the present invention are now provided, which have illustrative but non limiting purpose.

EXAMPLE 1

A series of glass jars having an internal volume of 50 mls. is placed in a muffle, provided with a gas aspiration at 575° C (the same average temperature of the annealing furnace in the manufacturing process).

In the front part of the muffle a throughhole is provided through which a stainless steel pipe (inner diameter: 8 mm.) can be inserted the pipe being each time moved forward inside each jar to be treated. a1

This pipe is connected, outside the muffle, with the saturator of fluosilicic acid by means of a polytetrafluoroethylene pipe, this material being known on the market with the name "Teflon," the pipe being flexible and externally insulated by a heating jacket. The saturator of fluosilicic acid, having a diameter of 5 cm. and 30 cm. high, which is filled by two thirds, is immersed in a thermostated bath at 70° C. At this temperature the equilibrium concentration of the acid is: F = 27.8%; F/Si = 5.08. an By a flowmeter an air amount of 50 lt/hour (at room temperature) is passed through the saturator. At this temperature the amounts of $H_2O$ and $SiF_4$ carried by the saturated air are 15.65 g $H_2O$/100 liters of air and 7.21 g. $SiF_4$/100 liters of air, respectively.

After the whole apparatus has been brought to standard operation for 30 minutes, by removing the gas carrying pipe from the muffle and feeding the gases under a hood, the treatment is started by introducing into the muffle and, from time to time, into the single jars the end of the carrying pipe and maintaining it in such a condition for the desired time. At the end of the treatment, the jars are kept at the same temperature for about 1 hour before being discharged. In a number of subsequent experiments, treatments have ben carried out for different times and, for each time value, 4 jars were treated.

The results have been evaluated by the test of chemical resistance of the U.S. Pharmacopeia according to which the alkali release after contact for one hour at 121° C with distilled water is titrated with 0.02N $H_2SO_4$. 47, Some results obtained for different treatment times are reported in the Table 1.

TABLE 1

| Sample No. | Treatment time,sec. | N/50 $H_2SO_4$ mls.employed | Average value | Glass colour |
|---|---|---|---|---|
| 1 | — | 1.46 | | |
| 2 | — | 1.70 | 1.560 | white transparent |
| 3 | — | 1.66 | | |
| 4 | — | 1.20 | | |
| 5 | 15 | 0.058 | | |
| 6 | 15 | 0.076 | 0.0745 | white transparent |
| 7 | 15 | 0.095 | | |
| 8 | 15 | 0.068 | | |
| 9 | 30 | 0.048 | | |
| 10 | 30 | 0.056 | 0.0525 | white transparent |
| 11 | 30 | 0.065 | | |
| 12 | 30 | 0.041 | | |
| 13 | 60 | 0.051 | | |
| 14 | 60 | 0.039 | 0.0438 | white transparent |
| 15 | 60 | 0.044 | | |
| 16 | 60 | 0.041 | | |
| 17 | 180 | 0.038 | | |
| 18 | 180 | 0.047 | 0.0420 | white slightly opaque |
| 19 | 180 | 0.051 | | |
| 20 | 180 | 0.038 | | |
| 21 | 360 | 0.043 | | |
| 22 | 360 | 0.052 | 0.0425 | white opaque |
| 23 | 360 | 0.038 | | |
| 24 | 360 | 0.037 | | |
| 25 | 720 | 0.048 | | |
| 26 | 720 | 0.040 | 0.0408 | white opaque |
| 27 | 720 | 0.036 | | |
| 28 | 720 | 0.039 | | |

EXAMPLE 2 include a

With the same apparatus and under the same conditions described in Example 1, further treatments of the same type of jar were carried out, except that the temperature of the suspension of fluosilicic acid was thermostated at 50° C.

At this temperature, the equilibrium concentration of the acid is: F = 31.5%; F/Si = 5.1.

In the gas phase the air contains: $H_2O$ = 5.29 g./100 liters air; $SiF_4$ = 2.98 g./100 liters air. In the following table the results are reported as the average of the four jars treated for each experiment, which was carried out at the temperature of 575° C.

TABLE 2

| Sample No | Treatment time,sec. | N/50 $H_2SO_4$ mls.employed | Glass colour |
|---|---|---|---|
| 101-104 | — | 1.56 | white trans- |

TABLE 2-continued

| Sample No | Treatment time,sec. | N/50 H$_2$SO$_4$ mls.employed | Glass colour |
|---|---|---|---|
| | | | parent |
| 105–108 | 15" | 0.112 | " |
| 109–112 | 30" | 0.082 | " |
| 113–116 | 60" | 0.075 | " |
| 118–120 | 180" | 0.061 | " |
| 121–124 | 360" | 0.047 | " |
| 125–128 | 720" | 0.046 | white slightly opaque |

In the preceding examples reference was constantly made to a gas treatment stream as generated according to the preferred embodiment, namely by bubbling through a solution of fluosilicic acid maintained at a predetermined temperature, but it goes without saying that the equilibrium expressed by the equation (2) may be generated in the said gas stream by other chemical and plant embodiments.

For instance, if no silica is present as a suspended matter or as a bottom body in the solution of fluosilicic acid, besides SiF$_4$ also HF will be generated, which passes directly in the gas stream.

We claim:

1. A method of preparing a glass surface resistant to chemical attack which comprises contacting the glass surface with an air stream containing an equilibrium mixture of silicon tetrafluoride, silicon dioxide, hydrogen fluoride and water vapor at a temperature of from 400° to 700° C for a time sufficient to reduce the alkali content of said glass.

2. The method of claim 1 wherein said treatment is carried out at a temperature of 500°–600° C.

3. The method of claim 1 wherein the time of the treatment and the molar ratio SiF$_4$/H$_2$O in the gas stream are adjusted as a function of the possible desired deposition of finely divided silicon dioxide onto the surface under treatment.

4. The method of claim 1 wherein said air stream of treatment is generated by bubbling a carrier gas through a solution of fluorosilicic acid.

5. The method of claim 4, wherein said solution of fluorosilicic acid contains silica either in suspension or as a bottom body and is maintained at a temperature rectangular 20° to 110° C.

6. Glass surfaces and articles resistant to the chemical attack, prepared by the method of claim 1. having 7. Glass surfaces and articles coated with a deposit of finely divided silica, prepared by the method of claim 1.

* * * * *